(12) United States Patent  (10) Patent No.: US 9,114,884 B2
Chelin et al.  (45) Date of Patent: Aug. 25, 2015

(54) AIRCRAFT NACELLE COMPRISING A REINFORCED OUTER WALL

(75) Inventors: Frédéric Chelin, Encausse (FR); Thierry Surply, Cornebarrieu (FR)

(73) Assignee: AIRBUS OPERATIONS SAS, Toulouse (FR)

(*) Notice: Subject to any disclaimer, the term of this patent is extended or adjusted under 35 U.S.C. 154(b) by 1002 days.

(21) Appl. No.: 13/258,588

(22) PCT Filed: Mar. 26, 2010

(86) PCT No.: PCT/FR2010/050556
§ 371 (c)(1),
(2), (4) Date: Dec. 2, 2011

(87) PCT Pub. No.: WO2010/109152
PCT Pub. Date: Sep. 30, 2010

(65) Prior Publication Data
US 2012/0060938 A1  Mar. 15, 2012

(30) Foreign Application Priority Data
Mar. 27, 2009 (FR) ..................... 09 01473

(51) Int. Cl.
*F02C 7/04* (2006.01)
*B64D 33/02* (2006.01)
*B64C 7/02* (2006.01)

(52) U.S. Cl.
CPC . *B64D 33/02* (2013.01); *B64C 7/02* (2013.01); *F02C 7/04* (2013.01); *F05D 2240/14* (2013.01); *F05D 2260/602* (2013.01); *Y02T 50/671* (2013.01); *Y10T 137/0536* (2015.04)

(58) Field of Classification Search
CPC ............. B64C 7/02; B64D 33/02; F02C 7/04; F05D 2240/14; F05D 2260/602
USPC ....... 137/15.1, 15.2; 244/53 B; 60/226.1, 796
See application file for complete search history.

(56) References Cited

U.S. PATENT DOCUMENTS

| 3,542,152 A | 11/1970 | Adamson et al. |
| 5,366,177 A * | 11/1994 | DeCoux ........................ 244/201 |
| 6,123,170 A * | 9/2000 | Porte et al. .................... 181/214 |
| 6,328,258 B1 * | 12/2001 | Porte ........................... 244/53 B |
| 6,848,656 B2 * | 2/2005 | Linton ....................... 244/134 C |

(Continued)

FOREIGN PATENT DOCUMENTS

EP 1 582 702 A1 10/2005
GB 635 082 A 4/1950

OTHER PUBLICATIONS

International Search Report, dated Nov. 5, 2010, from corresponding PCT application.

*Primary Examiner* — William H Rodriguez
(74) *Attorney, Agent, or Firm* — Young & Thompson

(57) ABSTRACT

An aircraft nacelle includes a wall that delimits an inside pipe (42) that channels a stream of air to a power plant, at the front a lip (44) and on the outside an outside wall (46) that delimits a cavity (54), whereby the outside wall includes—at its inside surface—at least one stiffener (58) that is arranged in a transverse plane, characterized in that the at least one stiffener (58) includes at least one drainage opening that allows the flow of liquids through the stiffener (58) in the direction of a discharge opening (56) that is located away from the lip in such a way as to limit the risks of air being sucked inside the cavity (54).

20 Claims, 2 Drawing Sheets

(56) References Cited

U.S. PATENT DOCUMENTS

| | | |
|---|---|---|
| 7,383,679 B2 | 6/2008 | Porte et al. |
| 7,506,838 B2 * | 3/2009 | Porte .......................... 244/53 B |
| 7,631,838 B2 * | 12/2009 | Layland et al. ........... 244/134 D |
| 8,646,723 B2 * | 2/2014 | Porte et al. .................. 244/53 B |
| 8,783,624 B2 * | 7/2014 | Koppelman et al. .......... 244/209 |
| 2003/0031556 A1 | 2/2003 | Mulcaire et al. |
| 2006/0219475 A1 | 10/2006 | Olsen et al. |
| 2010/0116943 A1 * | 5/2010 | Meister ......................... 244/208 |
| 2011/0147534 A1 * | 6/2011 | Chelin et al. ................ 244/53 B |
| 2011/0197973 A1 * | 8/2011 | Binks et al. .................. 137/15.1 |
| 2013/0098471 A1 * | 4/2013 | Porte et al. ................... 137/15.1 |
| 2013/0224000 A1 * | 8/2013 | Porte et al. .................. 415/182.1 |
| 2014/0001284 A1 * | 1/2014 | Porte et al. ............... 239/265.11 |

* cited by examiner

AIRCRAFT NACELLE COMPRISING A REINFORCED OUTER WALL

BACKGROUND OF THE INVENTION

1. Field of the Invention

This invention relates to an aircraft nacelle that comprises a reinforced outside wall.

2. Description of the Related Art

FIG. 1 shows a propulsion system 10 of an aircraft that is connected under the wing by means of a mast 12.

This propulsion system comprises a nacelle 14 in which a power plant that drives a fan that is mounted on its shaft 16 is arranged in an essentially concentric manner. For the description, the longitudinal direction corresponds to that of the axis of the nacelle that is referenced 18. The planes that are perpendicular to the longitudinal direction are called transverse planes.

As illustrated in FIG. 3, the nacelle 14 comprises a wall that delimits an inside pipe 20 that channels a stream of air to the power plant, at the front a lip 22 (forming a leading edge) and on the outside an outside wall 24 that is illustrated in detail in FIG. 2.

A front frame 26 is provided to connect the inside pipe 20 and the outside wall 24 and to support the lip 22. In addition, a rear frame 28 is provided to connect the inside pipe 20 and the outside wall 24 and to ensure the connection with the power plant M.

To reduce the noise pollution of the propulsion system, the inside pipe 20 comprises at least one acoustic treatment panel 30 that comprises—from the inside to the outside—a reflective layer, at least one alveolar structure, and at least one acoustically resistive layer that delimits the inside pipe 20 and channels the air in the direction of the power plant.

This acoustic treatment panel 30 can be equipped with a drainage system that makes it possible to discharge the water from the cells of the alveolar structure. For this purpose, the cells of the alveolar structure can comprise slots that make possible the circulation of liquids in the direction of the lower part of the panel 30. Other means can be considered for directing the liquids at the lower part of the panel 30.

Close to the generatrix of the panel 30 arranged at 6 o'clock, the reflective layer comprises a large number of openings that make possible the flow of liquids outside of the acoustic treatment panel as illustrated by the arrows 32 in FIG. 3. Thus, the drained liquids flow at the lower part of the cavity 34 that is delimited by the lower pipe 20, the front frame 26, the outside wall 24, and the rear frame 28.

As illustrated in FIGS. 2 and 3, the outside wall 24 comprises numerous circumferential stiffeners 36 for withstanding forces generated by the aerodynamic flows or possible shocks.

These circumferential stiffeners 36 come in the form of ribs projecting toward the inside of the cavity 34, as can be seen in FIGS. 2 and 3.

Each stiffener 36 constitutes a barrier that prevents the flow of liquids toward the low part of the cavity close to the rear frame 28, with the result that it is necessary to provide a large number of discharge openings 38 upstream from each stiffener so as to prevent the accumulation of water at this level.

This embodiment is not completely satisfactory for the following reasons:

During certain flight phases, partial vacuum phenomena can appear on the exterior of the nacelle and generate a pressure gradient P1<P2<P3<P4 at the surface where the discharge openings 38 are present. With the pressure inside the cavity 34 being essentially equal to the mean of pressures P1, P2, P3, and P4, there is therefore a risk of circulation from the outside to the inside of the cavity 34 at the first discharge openings 38, manifesting as stresses on the structure. To respond to these stresses, it is necessary to reinforce the outside wall 24; this is reflected by an increase in the onboard weight and therefore in energy consumption.

One solution can consist in replacing the discharge openings 38, which are located in the zone impacted by the partial vacuum phenomena, by a scoop. However, a scoop tends to increase the drag and therefore the energy consumption of the aircraft.

SUMMARY OF THE INVENTION

Also, the purpose of this invention is to remedy the drawbacks of the prior art by proposing an aircraft nacelle with a reinforced outside wall.

For this purpose, the invention has as its object an aircraft nacelle that comprises a wall that delimits an inside pipe that channels a stream of air to a power plant, at the front a lip and on the outside an outside wall that delimits a cavity, whereby said outside wall comprises—at its inside surface—at least one stiffener that is arranged in a transverse plane, characterized in that said at least one stiffener comprises at least one drainage opening that allows the flow of liquids through said stiffener in the direction of a discharge opening that is located away from the lip in such a way as to limit the risks of air being sucked inside said cavity.

BRIEF DESCRIPTION OF THE DRAWING FIGURES

Other characteristics and advantages will emerge from the following description of the invention, a description that is provided only by way of example, opposite the accompanying drawings in which.

DETAILED DESCRIPTION OF THE INVENTION

Figure 1:
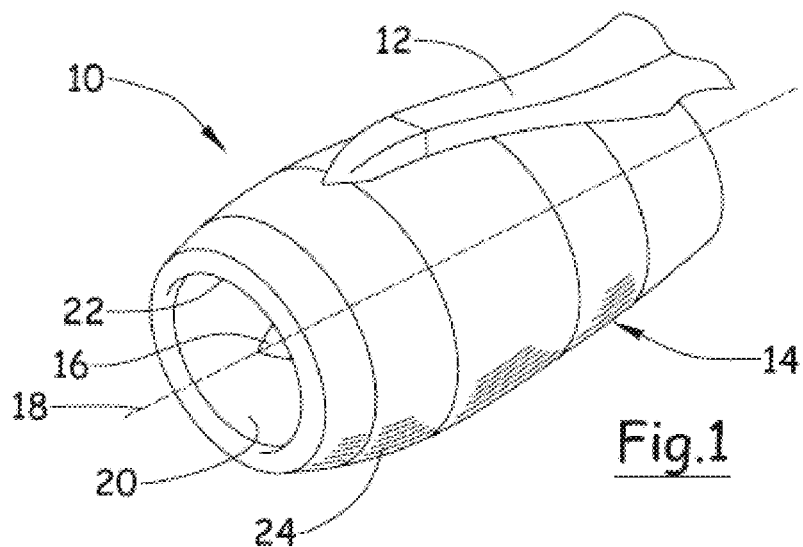
FIG. 1 is a perspective view of an aircraft nacelle.
Figure 2:
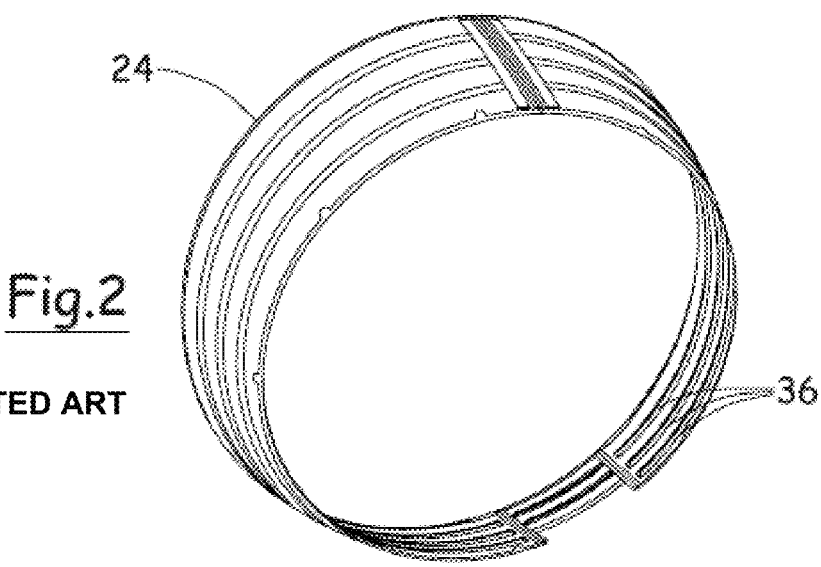
FIG. 2 is a perspective view of an outside wall according to the prior art.
Figure 3:
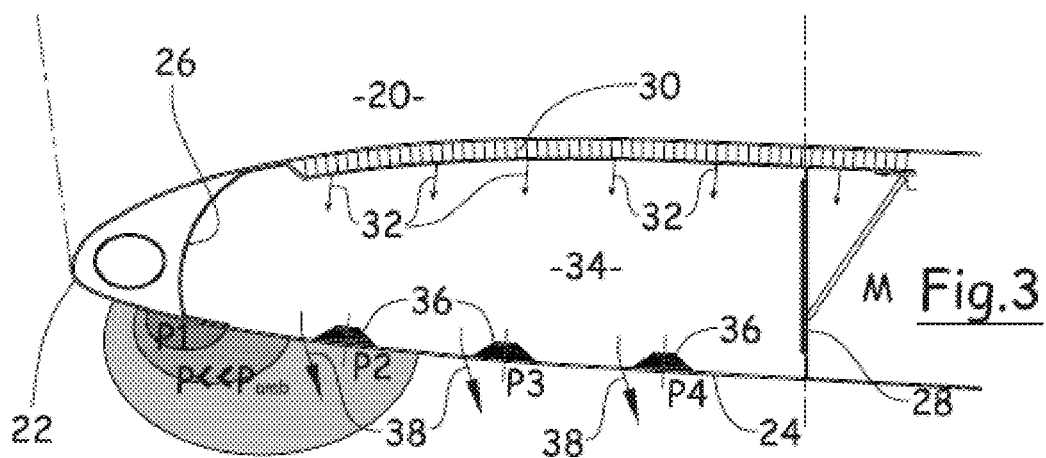
FIG. 3 is a cutaway of the lower part of the front of an aircraft nacelle according to the prior art.
Figure 4:
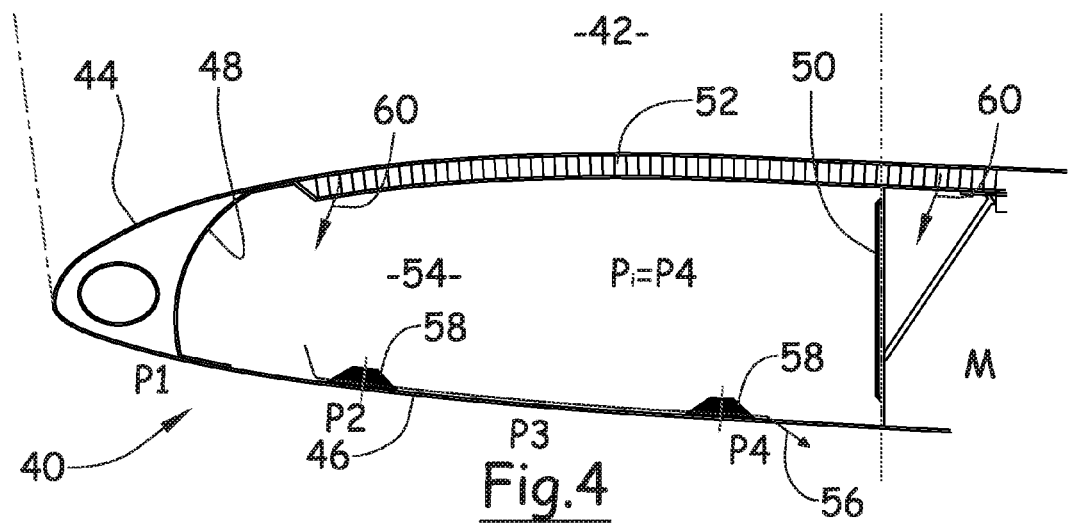
FIG. 4 is a cutaway of the lower part of the front of an aircraft nacelle according to the invention.

FIG. 4 shows a cutaway along a vertical longitudinal plane (containing the axis 18) of the front part of a nacelle 40. Thus, FIG. 4 illustrates the lower generatrix of the nacelle.

In a known manner, the nacelle 40 comprises a wall that delimits an inside pipe 42 that channels a stream of air to the power plant, at the front a lip 44 (forming a leading edge) and on the outside an outside wall 46.

A front frame 48 is provided to connect the wall that delimits the inside pipe 42 and the outside wall 46 and to support the lip 44. In addition, a rear frame 50 is provided for connecting the inside pipe 42 and the outside wall 46 and for ensuring the connection with the power plant M.

To reduce the noise pollution of the propulsion system, the inside pipe 42 preferably comprises at least one acoustic treatment panel 52 that comprises—from the inside to the outside—a reflective layer, at least one alveolar structure, and at least one acoustically resistive layer that delimits the inside pipe 42 and channels the air in the direction of the power plant.

This acoustic treatment panel 52 can be equipped with a drainage system that makes it possible to discharge the water from the cells of the alveolar structure. For this purpose, the cells of the alveolar structure can comprise slots that make possible the circulation of liquids in the direction of the lower part of the panel 52. Other means can be considered for directing the liquids at the level of the lower part of the panel 52.

At the generatrix of the panel 52 that is arranged at 6 o'clock, the reflective layer comprises a large number of openings that make possible the flow of liquids outside of the acoustic treatment panel. Thus, the drained liquids flow at the lower part of the cavity 54 that is delimited by the wall of the inside pipe 42, the front frame 48, the outside wall 46, and the rear frame 50.

The nacelle 40 comprises at least one opening 56 for discharging liquids outside of the nacelle by gravity provided close to the rear frame 50 that corresponds to the lowest point of the cavity 54.

At its inside surface, the outside wall 46 can comprise at least one stiffener 58. Preferably, this stiffener 58 is circumferential and arranged in a transverse plane.

According to one embodiment, a stiffener 58 has a trapezoidal cross-section, with the large base being flattened against the inside surface of the outside wall 46. However, the invention is not limited to this type of stiffener.

According to the invention, each stiffener 58 comprises at least one drainage opening 62 that allows the flow of liquids through said stiffener by gravity in the direction of a discharge opening 56 that is arranged close to the rear frame 50, located away from the front zone at which partial vacuum phenomena can appear during certain flight phases. This arrangement makes it possible to prevent the accumulation of liquids upstream from the stiffeners, which makes it possible to eliminate the discharge openings upstream from the stiffeners.

The fact of providing only a single discharge opening 56 located away from the lip makes it possible to limit the risks of air being sucked in inside the cavity 54 because of the partial vacuum phenomena that can appear at the front of the outside wall 46. According to the invention, the pressure inside the cavity 54 is essentially equal to P4, with the pressure prevailing outside of the nacelle opposite the discharge opening 56, with the result that there is no risk of circulation from the outside to the inside of the nacelle at a partial vacuum zone.

With the stresses linked to these partial vacuum phenomena being reduced, the outside wall 46 is less stressed with the result that the number of stiffeners 58 can be reduced, which tends to reduce the onboard weight and therefore the energy consumption.

According to another advantage, with the number of discharge openings 56 (and therefore leaks) being limited to one, it is optionally possible to generate a slight overpressure in the cavity 54 so as to increase the mechanical strength of the outside wall 54.

Figure 5A:
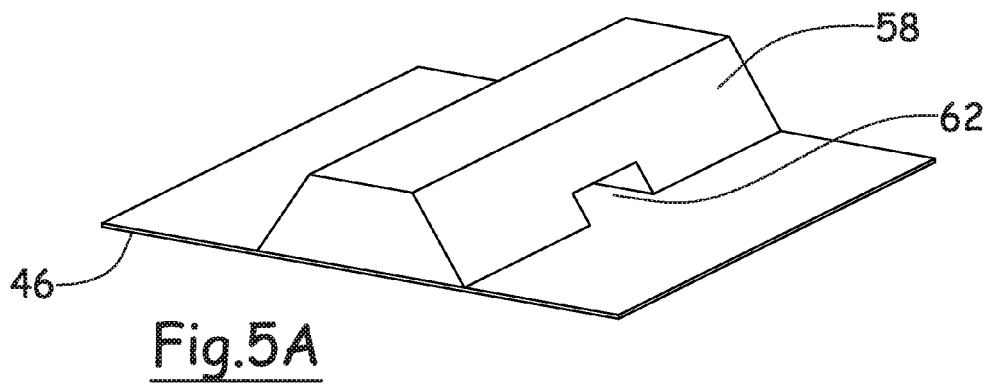
FIGS. 5A to 5C are perspectives that illustrate a portion of a stiffener of an outside wall according to different variants of the invention.
Figures 5B, 5C:
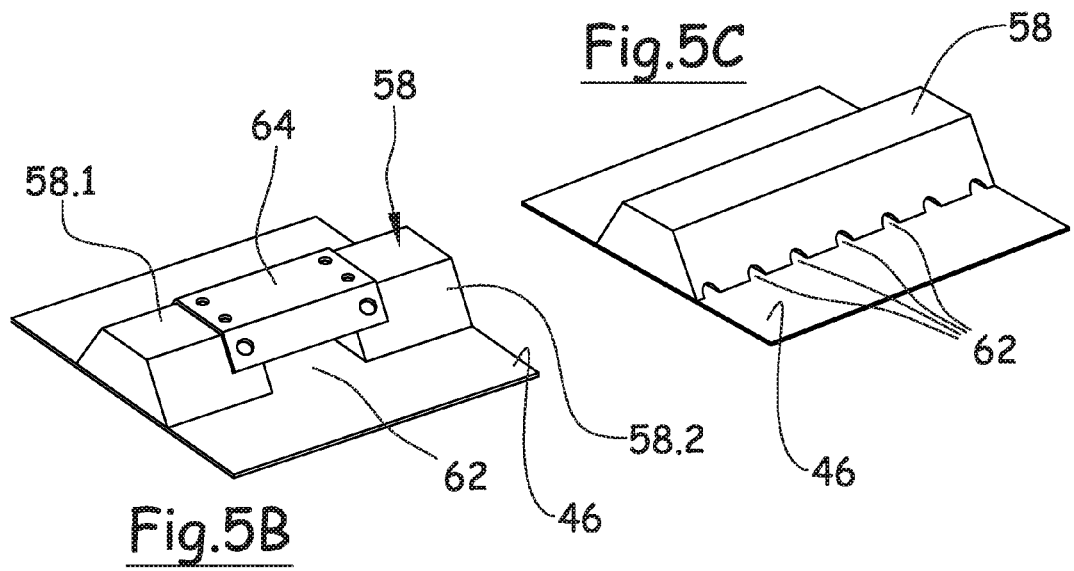

According to a first variant, each stiffener 58 comprises—at the lower zone of the nacelle—a single drainage opening 62 as illustrated in FIGS. 5A and 5B. As a variant, it is possible to provide—for each stiffener 58—several drainage openings 62 with smaller cross-sections, as illustrated in FIG. 5C.

According to the variants illustrated in FIGS. 5A and 5C, the stiffener 58 is continuous and comprises—at the surface able to be in contact with the inside surface of the outside wall 46—at least one groove that is arranged perpendicularly relative to said stiffener that forms—when the stiffener is flattened against the outside wall 46—at least one drainage opening 62.

According to other variants illustrated in FIG. 5B, the stiffener 58 is discontinuous, and the parts of the stiffener 58.1 and 58.2 are spaced in such a way as to allow the liquids to pass. A connection 64 makes it possible to ensure the resumption of forces by connecting—by all suitable means—the parts 58.1 and 58.2 of the stiffener, whereby said connection 64 is offset relative to the inside surface of the outside wall 46 in such a way as to delimit a drainage opening 62.

The invention claimed is:

1. An aircraft nacelle that comprises:
    a wall that delimits an inside pipe configured to channel a stream of air to a power plant;
    a lip at a front of the nacelle;
    an outside wall that delimits a cavity;
    at least one stiffener at an inside surface of the outside wall that is arranged in a transverse plane, said at least one stiffener comprising at least one drainage opening configured to allow a flow of liquids through said stiffener; and
    a discharge opening for the flow of liquids that is located away from the lip in such a way as to limit risks of air being sucked inside said cavity, the discharge opening and the at least one drainage opening being located at a lower part of the nacelle at a lowest point of the cavity.

2. The aircraft nacelle according to claim 1, wherein at a lower height of the nacelle, the at least one stiffener comprises a single drainage opening.

3. The aircraft nacelle according to claim 1, wherein at a lower height of the nacelle, the at least one stiffener comprises several drainage openings with small cross-sections.

4. The aircraft nacelle according to claim 1, wherein the at least one stiffener is continuous and comprises at a surface that contacts the surface of the outside wall at at least one groove that is arranged perpendicularly relative to said stiffener that forms, when the stiffener is flattened against the inside surface of the outside wall, the at least one drainage opening.

5. The aircraft nacelle according to claim 1, wherein the at least one stiffener is discontinuous, with parts of the at least one stiffener being spaced in such a way as to allow liquids to pass and connected by a connection that is offset relative to the inside surface of the outside wall in such a way as to delimit the drainage opening.

6. The aircraft nacelle according to claim 2, wherein the at least one stiffener is continuous and comprises at a surface that contacts the surface of the outside wall at at least one groove that is arranged perpendicularly relative to said at least one stiffener that forms, when the at least one stiffener is flattened against the inside surface of the outside wall, the at least one drainage opening.

7. The aircraft nacelle according to claim 3, wherein the at least one stiffener is continuous and comprises at a surface that contacts the surface of the outside wall at at least one groove that is arranged perpendicularly relative to said at least one stiffener that forms, when the stiffener is flattened against the inside surface of the outside wall, the at least one drainage opening.

8. The aircraft nacelle according to claim 2, wherein the at least one stiffener is discontinuous, with parts of the at least one stiffener being spaced in such a way as to allow liquids to pass and connected by a connection that is offset relative to the inside surface of the outside wall in such a way as to delimit the drainage opening.

9. The aircraft nacelle according to claim 3, wherein the at least one stiffener is discontinuous, with parts of the at least one stiffener being spaced in such a way as to allow liquids to pass and connected by a connection that is offset relative to the inside surface of the outside wall in such a way as to delimit the drainage opening.

10. The aircraft nacelle according to claim 1, further comprising:
a front frame that connects the wall that delimits the inside pipe and the outside wall, and to support the lip.

11. The aircraft nacelle according to claim 1, further comprising:
a rear frame connecting the inside pipe and the outside wall.

12. The aircraft nacelle according to claim 1, wherein the inside pipe comprises at least one acoustic treatment panel.

13. The aircraft nacelle according to claim 12, wherein the at least one acoustic treatment panel comprises from inside to outside a reflective layer, at least one alveolar structure and at least one acoustically resistive layer that delimits the inside pipe.

14. The aircraft nacelle according to claim 12, wherein the at least one acoustic treatment panel is equipped with a drainage system.

15. The aircraft nacelle according to claim 1, wherein the stiffener has a trapezoidal cross section with a large base flattened against the inside surface of the outside wall.

16. The aircraft nacelle according to claim 1, further comprising:
a rear frame connecting the inside pipe and the outside wall,
there are a plurality of said stiffeners such that each stiffener allows the flow of liquids through the drainage opening in a direction of the discharge opening, and
the discharge opening is located close to the rear frame such that a partial vacuum appears, thereby preventing accumulation of liquid upstream from the stiffeners.

17. The aircraft nacelle according to claim 16, wherein there are no discharge openings upstream of the stiffeners with respect to the stream of air flowing to the power plant.

18. The aircraft nacelle according to claim 16, wherein there is only one discharge opening.

19. An aircraft nacelle that comprises:
a wall that delimits an inside pipe configured to channel a stream of air to a power plant;
a lip at a front of the nacelle;
an outside wall that delimits a cavity;
at least one stiffener at an inside surface of the outside wall that is arranged in a transverse plane, said at least one stiffener comprising at least one drainage opening configured to allow a flow of liquids through said stiffener; and
only one discharge opening for the flow of liquids that is located away from the lip, and near a rear frame connecting the inside pipe and the outside wall, in such a way as to limit risks of air being sucked inside said cavity, and the discharge opening and the only one drainage opening being located at a lower part of the nacelle at a lowest point of the cavity.

20. The aircraft nacelle according to claim 19, wherein
there are a plurality of said stiffeners such that each stiffener allows the flow of liquids through the drainage opening in a direction of the only one discharge opening, and
the only one discharge opening is located close to the rear frame such that a partial vacuum appears, thereby preventing accumulation of liquid upstream from the stiffeners.

* * * * *